United States Patent
Victor et al.

(10) Patent No.: US 9,738,801 B2
(45) Date of Patent: Aug. 22, 2017

(54) METALLIC LEP INKS AND ASSOCIATED METHODS

(75) Inventors: Gal Victor, Rehovot (IL); Galia Golodetz, Rehovot (IL); Jose Kuperwasser, Ashdod (IL); Vladislav Kaploun, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 388 days.

(21) Appl. No.: 13/820,041

(22) PCT Filed: Oct. 29, 2010

(86) PCT No.: PCT/US2010/054865
§ 371 (c)(1),
(2), (4) Date: Feb. 28, 2013

(87) PCT Pub. No.: WO2012/057800
PCT Pub. Date: May 3, 2012

(65) Prior Publication Data
US 2013/0158187 A1  Jun. 20, 2013

(51) Int. Cl.
*C09D 11/104* (2014.01)
*C09D 11/52* (2014.01)

(52) U.S. Cl.
CPC ............ *C09D 11/104* (2013.01); *C09D 11/52* (2013.01)

(58) Field of Classification Search
CPC .............................. C09D 11/104; C09D 11/52
USPC ....................................................... 523/160
See application file for complete search history.

(56) References Cited

U.S. PATENT DOCUMENTS

| | | | |
|---|---|---|---|
| 5,183,214 A | 2/1993 | Zakheim et al. | |
| 5,868,959 A | 2/1999 | Mayo et al. | |
| 6,398,861 B1 | 6/2002 | Knox | |
| 7,253,216 B2 | 8/2007 | Miyabayashi | |
| 7,445,667 B2 | 11/2008 | Nagano et al. | |
| 7,569,106 B2 | 8/2009 | Heubach et al. | |
| 7,628,849 B1 | 12/2009 | Diehl et al. | |
| 2002/0111421 A1* | 8/2002 | Van Rooyen ...... C08G 18/4063 524/589 | |
| 2004/0020406 A1 | 2/2004 | Kato | |
| 2004/0180213 A1 | 9/2004 | Harris et al. | |
| 2006/0060110 A1 | 3/2006 | Aoshima | |
| 2006/0166150 A1 | 7/2006 | Sakuragi et al. | |
| 2007/0020545 A1* | 1/2007 | Bossidan et al. ........ 430/108.21 | |
| 2007/0051272 A1 | 3/2007 | Wheeler | |
| 2008/0216706 A1 | 9/2008 | Ikeya et al. | |
| 2010/0062360 A1 | 3/2010 | Victor | |

FOREIGN PATENT DOCUMENTS

| | | | | |
|---|---|---|---|---|
| EP | 0451785 A1 | 10/1991 | | |
| EP | 2083052 A1 | 7/2009 | | |
| EP | 2394952 A2 | 12/2011 | | |
| KR | 20100090216 | 8/2010 | | |
| WO | WO-00/37660 | 6/2000 | | |
| WO | WO 2007/106396 | * | 9/2007 | ............... G03G 9/12 |
| WO | WO 2008/013522 | * | 1/2008 | ............... G03G 9/08 |

OTHER PUBLICATIONS

Union Process—Laboratory Grinding Mills, pp. 1-9, Union Process, 2003 obtained online from: http://web.archive.org/web/20030701000000*/http://www.unionprocess.com/pdf/lab_attritors.pdf.*
Peter Wissling, Metallic Effect Pigments: Fundamentals and Applications, Vincentz Network GmbH & Co. KG, Hannover/Germany, 2006, p. 12.*
BASF—Pigments Tehcnical Information, pp. 1-11, BASF May 2007.*
Pigment Blue 15:3, pp. 1-14, obtained online from: http://www.dyestuffintermediates.com/pigment-dye/pigment-blue-153.html, no publicaiton date given.*
STN Search Report, pp. 1-11.*
Pigment Milling and Monitoring Particle Size Using Dynamic Light Scattering Techniques From Malvern Instruments, pp. 1-5, AZO Materials, Jan. 20, 2005, obtained online from: http://www.azom.com/article.aspx?ArticleID=2724.*
International Search Report and Written Opinion for PCT/US2010/054865 dated Jul. 26, 2011 (8 pages).
Extended European Search Report; Application No. 10859110.8; dated May 8, 2014.

* cited by examiner

*Primary Examiner* — Alexander Kollias
(74) *Attorney, Agent, or Firm* — Dierker & Kavanaugh, P.C.

(57) ABSTRACT

The present disclosure provides metallic LEP inks and associated methods. In one example, a method of manufacturing a metallic LEP ink having reduced impurities can comprising adding a metallic pigment slurry and a resin to a stainless steel attritor, adding ceramic grinding beads to the attritor, and grinding the metallic pigment and the resin to form the metallic LEP ink.

14 Claims, No Drawings

METALLIC LEP INKS AND ASSOCIATED METHODS

BACKGROUND

Digital printing involves technologies in which a printed image is created directly from digital data, for example using electronic layout and/or desktop publishing programs. Known methods of digital printing include full-color ink-jet, electrophotographic printing, laser photo printing, and thermal transfer printing methods.

Electrophotographic printing techniques involve the formation of a latent image on a photoconductor surface mounted on an imaging plate. The photoconductor is first sensitized to light, usually by charging with a corona discharge, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. The developed image is transferred from the photoconductor to a rubber offset blanket, from which it is transferred to a substrate, such as paper, plastic or other suitable material, by heat or pressure or a combination of both to produce the printed final image.

The latent image is developed using either a dry toner (a colorant mixed with a powder carrier) or a liquid ink (a suspension of a colorant in a liquid carrier). The toner or ink generally adheres to the substrate surface with little penetration into the substrate. The quality of the final image is largely related to the size of the particles, with higher resolution provided by smaller particles.

Dry toners used in solid electrophotography are fine powders with a relatively narrow particle size distribution that are expelled from fine apertures in an application device. A typical dry toner is predominantly composed of a heat-sensitive polymer (e.g., acrylic, styrene) and a pigment such as carbon black with a solid carrier, typically resin coated iron or steel powders. Variations in particle shape and charge-to-mass ratio as well as dust particles found in the dry ink may cause technical difficulties during the printing process. Larger or irregularly shaped particles can cause blockage while dust particles that are too small to hold a sufficient charge to be controllable adhere to the print head surface.

Liquid inks used in liquid electrophotography are generally comprised of pigment- or dye-based thermoplastic resin particles suspended in a non-conducting liquid carrier, generally a saturated hydrocarbon. Offset-preventing and release-facilitating oil, such as silicone oil, is often used to increase the efficiency of ink transfer from the imaging surface. The liquid ink is electrophotographically charged and brought into contact with the photoconductor surface to develop the latent image. When transferred to an offset blanket and heated, the particles melt and fuse to form a tacky polymer film. When the tacky polymer film comes in contact with a cooler surface, such as a paper substrate, the film hardens and adheres to the substrate and peels away from the blanket, laminating the paper. The ink is deposited onto the substrate essentially dry, and desired print finishing can be performed immediately. Since the ink is transferred essentially completely from the blanket to the substrate, a new layer in a different color can be created for every rotation of the press.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "electrophotographic ink vehicle" refers to a solvent containing a pigment that has been formulated for electrophotographic printing.

As used herein, "solvent" refers to the fluid in which the pigment of the present disclosure can be dispersed to form a pigment dispersion. Such a solvent can be formulated into an electrophotographic ink vehicle appropriate for electrophotographic printing where the electrophotographic ink vehicle has a viscosity and conductivity for such printing and may include a mixture of a variety of different agents, including without limitation, surfactants, organic solvents and co-solvents, charge control agents, buffers, biocides, viscosity modifiers, sequestering agents, stabilizing agents, and anti-kogation agents. Though not part of the electrophotographic ink vehicle per se, in addition to the pigment, the liquid vehicle can include a dispersant for the pigment and can further carry solid additives such as resins, latexes, UV curable materials, plasticizers, salts, charge control agents etc.

As used herein, "co-solvent" refers to any solvent, including organic solvents, present in the electrophotographic ink vehicle.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used herein, "heteroatom" refers to nitrogen, oxygen, halogens, phosphorus, or sulfur.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms, for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" refers to an alkyl group having from 1 to 6 carbon atoms. The term "higher alkyl" refers to an alkyl group having more than 6 carbon atoms, for example, 7 to about 50 carbon atoms, or 7 to about 40 carbon atoms, or 7 to about 30 carbon atoms or more. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, lower alkyl, and heteroalkyl.

As used herein, "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that a liquid electrophotographic (LEP) metallic ink having reduced impurities can be produced with relatively short grinding time using ceramic grinding media in a stainless-steel attritor vessel. In other words, the present LEP inks can provide a cleaner, brighter ink layer compared to metallic inks manufactured by traditional techniques disclosed in the prior art. Notably, LEP ink compositions typically have significantly different characteristics than traditional aqueous based ink-jet inks. As such, the present LEP inks can provide an acceptable viscosities and conductivity for electrophotographic printing in addition to providing durable printed images.

In accordance with this, the present disclosure is drawn to metallic LEP ink compositions and methods, where the metallic LEP ink generally comprises an electrophotographic ink vehicle and a pigment. It is noted that when discussing the present compositions and associated methods, each of these discussions can be considered applicable to each of these embodiments, whether or not they are explicitly discussed in the context of that embodiment. Thus, for example, in discussing a solvent for use in a metallic LEP ink, such a solvent can also be used for a method of making the metallic LEP ink or a method of reducing impurities in a metallic LEP ink, and vice versa.

As such, a method of manufacturing a metallic LEP ink having reduced impurities can comprise adding a metallic pigment slurry and a resin to a stainless steel attritor, adding ceramic grinding beads to the attritor, and grinding the metallic pigment and the resin to form the metallic LEP ink. The metallic slurry can comprise a metallic pigment and a solvent.

Additionally, a method of reducing impurities in a metallic LEP ink can comprise adding a metallic pigment slurry and a resin to a stainless steel attritor, adding ceramic grinding beads to the attritor, and grinding the metallic pigment and the resin to form the metallic LEP ink, where the reduced impurities are measured as a function of brightness of the metallic LEP ink compared to a comparable LEP ink; the comparable LEP ink having the same components and same amounts as the LEP ink but produced by a second attritor with second grinding beads made from the same material; where the metallic LEP ink is brighter than the comparable LEP ink.

In the present method the grinding can be performed from 1 hour to 20 hours. In one example, the grinding can be performed less than 10 hours. Additionally, the grinding can be performed at less than 1000 rpm. The grinding can also be performed at a temperature from 20° C. to 60° C. In one example, the temperature can be from 25° C. to 50° C.

Further, a metallic LEP ink having reduced impurities can comprise a metallic pigment, a resin, solvent, charge adjuvant and additives. The metallic LEP ink can any of the methods described herein. The reduced impurities can be measured as a function of optical density of the metallic LEP ink compared to a comparable LEP ink as discussed herein.

Generally, the metallic LEP inks disclosed herein can have reduced impurities as compared to comparable metallic LEP inks not produced by the methods disclosed herein. Without being bound by any particular theory, the present methods utilize different grinding materials during a grinding step in the manufacturing process that provides an ink free of impurities caused by joint friction of similar materials. The present methods generally employ the use of ceramic grinding media with a stainless steel attritor vessel providing a brighter metallic LEP ink. Additionally, the present inventors have unexpectedly found that the combination of the ceramic grinding media with the stainless steel attritor vessel provides a brighter ink than a comparable metallic LEP ink produced by stainless steel grinding media with a stainless steel attritor vessel or by ceramic grinding media with a ceramic attritor vessel. Specific data is provided in the Examples below.

The brightness discussed herein can be measured in terms of optical density, the lower optical density being indicative of a brighter ink. In one example, the metallic LEP ink can have an optical density at least 5% lower than the comparable LEP ink. In another example, the metallic LEP ink can have an optical density at least 10% lower than the comparable LEP ink. In still another example, the metallic LEP ink can have an optical density at least 15% lower than the comparable LEP ink. In yet another example, the metallic LEP ink can have an optical density at least 20% lower than the comparable LEP ink.

Generally, the metallic LEP ink can include an aliphatic solvent including substituted or unsubstituted, linear or branched, aliphatic compounds. Additionally, such solvents can include aryl substituents. In one embodiment, the aliphatic solvent can be substantially nonaqueous, e.g., containing less than 0.5% water. In another embodiment, the aliphatic solvent can be nonaqueous. The aliphatic solvent can comprise a member selected from the group of paraffins, isoparaffins, oils, alkanes having from about 6 to about 100 carbon atoms, and mixtures thereof.

In one embodiment, the metallic LEP ink can include at least one aliphatic hydrocarbon, such as a paraffin and/or isoparaffin. As such, the aliphatic solvent can comprise, or substantially comprise, or even consist essentially of isoparaffins, such as or equivalent to the ISOPAR® high-purity isoparaffinic solvents with narrow boiling ranges marketed by Exxon Mobil Corporation (Fairfax, Va., USA). Also suitable as an aliphatic solvent, or cosolvent, for implementing embodiments of the present invention are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as an aliphatic solvent, or cosolvent, are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such an aliphatic solvent, or cosolvent, can have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity.

Generally, the metallic LEP inks can have a conductivity of less than about 300 pS/cm. In one embodiment, the metallic LEP inks can have a conductivity of less than about 200 pS/cm, or in another embodiment, even less than 100 pS/cm.

Generally, the metallic pigments used herein can be any colored metallic pigments and non-colored metallic pigments including aluminum pigments, silver pigments, platinum pigments, tin pigments, copper pigments, bronze pigments, gold pigments, etc. The metallic pigment can be present in the metallic LEP ink from about 0.01 wt % to about 60 wt %. In one embodiment, the pigment can be present from about 0.1 wt % to about 40 wt % of the metallic LEP ink.

The metallic LEP inks described herein can include a resin. The resin can be polymerized from monomers selected from the group of ethylene acrylic acid, ethylene methacrylic acid, ethylene acrylic ester maleic anhydride, ethylene acrylic ester glycidyl methacrylate, maleic anhydride, styrene maleic anhydride, and mixtures thereof. The resin can encapsulate the pigment during grinding or mixing to create an ink particle. The ink particle can have a final particle size from about 1 micron to about 30 microns. Additionally, the resin can have a thickness of about 10 nm to about 10,000 nm. The resin encapsulated pigments can be formulated to provide a specific melting point. In one example, the melting point can be from about 30° C. to about 150° C. In another example, the melting point can be from about 50° C. to about 100° C. Such melting points can allow for desired film formation after printing.

The metallic LEP ink compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof.

EXAMPLES

The following examples illustrate a number of embodiments of the present compositions, systems, and methods that are presently known. However, it is to be understood that the following are only exemplary or illustrative of the application of the principles of the present compositions and methods. Numerous modifications and alternative compositions and methods may be devised by those skilled in the art without departing from the spirit and scope of the present systems and methods. The appended claims are intended to cover such modifications and arrangements. Thus, while the present compositions and methods have been described above with particularity, the following examples provide further detail in connection with what are presently deemed to be the acceptable embodiments.

Example 1

Preparation of Metallic LEP Ink

A resin (random terpolymer of ethylene, acrylic ester and maleic anhydride—Lotader® 4210 from Arekam France), and Isopar™ L (isoparaffin) was mixed in a double planetary mixer at a temperature of approximately 140° C. for 5 hours. The resulting paste was combined with a metallic aluminum pigment, charge adjuvant, and Isopar™ L in a stainless steel attritor with ceramic beads of 5.2 mm diameter for 5 hours at 35° C. at 250 rpm to obtain the metallic LEP ink.

Example 2

Preparation of Comparable LEP Ink #1

The comparative ink was prepared with the components, the specific amounts, and under the specific conditions of Example 1, except that the attritor and the beads used were both stainless steel.

Example 3

Preparation of Comparable LEP Ink #2

The comparative ink was prepared with the components, the specific amounts, and under the specific conditions of Example 1, except that the attritor and the beads used were both ceramic.

Example 4

Reduced Impurities Data

The metallic ink of Example 1 and the comparable inks of Examples 2 and 3 were measured for optical density by using X-Rite 500 series spectrodensitometer, reading the optical density in the V channel. The following results, summarized in Table 1, were obtained:

TABLE 1

| LEP INK | Optical Density |
| --- | --- |
| Metallic LEP Ink of Example 1 | 0.42 |
| Comparable LEP Ink #1 of Example 2 | 0.52 |
| Comparable LEP Ink #2 of Example 3 | 0.48 |

As can be seen in Table 1, the metallic ink manufactured by the methods of the present disclosure provided a significantly lower optical density than that achieved by the comparable LEP inks.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. A method of manufacturing a metallic liquid electrophotographic ink having reduced impurities, consisting of:
   adding a metallic pigment slurry and a resin to a stainless steel attritor;
   adding ceramic grinding beads to the attritor; and
   performing a single grinding step consisting of grinding the metallic pigment slurry and the resin simultaneously to form the metallic liquid electrophotographic ink, wherein the grinding of the metallic pigment slurry and the resin is performed for less than 10 hours, without a change to RPM (revolutions per minute) throughout the grinding and wherein the RPM is less than 1000 RPM;
   wherein the metallic pigment slurry consists of a metallic pigment, a solvent, and a charge adjuvant;
   and wherein the metallic pigment consists of a metal selected from the group consisting of aluminum, silver, platinum, tin, copper, bronze, gold, and mixtures thereof.

2. The method of claim 1, wherein the solvent is selected from the group consisting of paraffins, isoparaffins, oils, alkanes having from about 6 to about 100 carbon atoms, and mixtures thereof.

3. The method of claim 1, wherein the resin is polymerized from monomers selected from the group consisting of ethylene acrylic acid, ethylene methacrylic acid, ethylene acrylic ester maleic anhydride, ethylene acrylic ester glycidyl methacrylate, maleic anhydride, styrene maleic anhydride and mixtures thereof.

4. The method of claim 1, wherein the grinding of the metallic pigment slurry and the resin is performed at a single temperature.

5. The method of claim 1, wherein the reduced impurities are measured as a function of brightness of the metallic liquid electrophotographic ink compared to a comparable liquid electrophotographic ink; the comparable liquid electrophotographic ink having the same components and same amounts as the liquid electrophotographic ink but produced by a second attritor with second grinding beads made from the same material; the metallic liquid electrophotographic ink being brighter than the comparable liquid electrophotographic ink.

6. The method of claim 5, wherein the brightness is measured as optical density, a lower optical density being indicative of a brighter ink, wherein the metallic liquid electrophotographic ink has an optical density at least 5% lower than the comparable liquid electrophotographic ink.

7. The method of claim 5, wherein the second attritor and the second grinding beads are made from stainless steel or ceramic.

8. A method of manufacturing a metallic liquid electrophotographic ink having reduced impurities, consisting of:
   adding a metallic pigment slurry and a resin to a stainless steel attritor;
   adding ceramic grinding beads to the attritor; and
   performing a single grinding step consisting of grinding the metallic pigment slurry and the resin simultaneously to form the metallic liquid electrophotographic ink, wherein the grinding of the metallic pigment slurry and the resin is performed without a change to RPM (revolutions per minute) throughout the grinding and the RPM is less than 1000 RPM;
   wherein the grinding is performed for at least 1 hour to less than 10 hours at a temperature from 20° C. to 60° C.;
   wherein the metallic pigment slurry consists of a metallic pigment, a solvent, and a charge adjuvant;
   and wherein the metallic pigment consists of a metal selected from the group consisting of aluminum, silver, platinum, tin, copper, bronze, gold, and mixtures thereof.

9. A method of reducing impurities in a metallic electrophotographic ink, consisting of:
   adding a metallic pigment slurry and a resin to a stainless steel attritor;
   adding ceramic grinding beads to the attritor; and
   performing a single grinding step consisting of grinding the metallic pigment slurry and the resin simultaneously to form the metallic liquid electrophotographic ink, wherein the grinding of the metallic pigment slurry and the resin is performed for less than 10 hours, and at 250 RPM (revolutions per minute) throughout the grinding;
   wherein the reduced impurities are measured as a function of brightness of the metallic liquid electrophotographic ink compared to a comparable liquid electrophotographic ink; the comparable liquid electrophotographic ink having the same components and same amounts as the liquid electrophotographic ink but produced by a second attritor with second grinding beads made from the same material; the metallic liquid electrophotographic ink being brighter than the comparable liquid electrophotographic ink;
   wherein the metallic pigment slurry consists of a metallic pigment, a solvent, and a charge adjuvant;
   and wherein the metallic pigment consists of a metal selected from the group consisting of aluminum, silver, platinum, tin, copper, bronze, gold, and mixtures thereof.

10. The method of claim 9, wherein the brightness is measured as optical density, a lower optical density being indicative of a brighter ink, wherein the metallic liquid electrophotographic ink has an optical density at least 5% lower than the comparable liquid electrophotographic ink.

11. The method of claim 9, wherein the grinding is performed for at least 1 hour and at a temperature from 20° C. to 60° C.

12. A method of manufacturing a metallic liquid electrophotographic ink having reduced impurities, consisting of:

adding a metallic pigment slurry and a resin to a stainless steel attritor, wherein the metallic pigment slurry consists of a metallic pigment, a solvent, and a charge adjuvant, and wherein the metallic pigment consists of a metal;

adding ceramic grinding beads to the attritor; and grinding the metallic pigment slurry and the resin simultaneously to form the metallic liquid electrophotographic ink, wherein the grinding of the metallic pigment slurry and the resin is performed without a change to RPM (revolutions per minute) throughout the grinding and wherein the grinding is performed at 250 RPM for only 5 hours at 35° C.

13. The method of claim 12, wherein the metal is selected from the group consisting of aluminum, silver, platinum, tin, bronze, gold, and mixtures thereof; and the solvent is selected from the group consisting of paraffins, isoparaffins, oils, alkanes having from about 6 to about 100 carbon atoms, and mixtures thereof.

14. The method of claim 12, wherein the metal is copper; and the solvent is selected from the group consisting of paraffins, isoparaffins, oils, alkanes having from about 6 to about 100 carbon atoms, and mixtures thereof.

\* \* \* \* \*